United States Patent Office 2,919,974
Patented Jan. 5, 1960

2,919,974

SOLVENTS FOR THE MANUFACTURE OF HYDROGEN PEROXIDE BY HYDROGENATION AND OXIDATION OF THE ALKYLATED ANTHRAQUINONES

Charles Dufraisse, Paris, Lucien Villemey, Lyon, and Paul Mollard, Pierre-Benite, France, assignors to l'Etat Francais, Societe d'Electrochimie, d'Electrometallurgie et des Acieries Electriques d'Ugine, and l'Air Liquide Societe Anonyme pour l'Etude et l'Exploitation des Procedes George Claude No Drawing. Application April 28, 1953
Serial No. 351,737

Claims priority, application France May 5, 1952

15 Claims. (Cl. 23—207)

The present invention relates in an improvement in the manufacture of hydrogen peroxide by oxidizing organic compounds such as alkylated anthraquinones which have previously been hydrogenated, the said hydrogen peroxide being extracted from the medium by washing with water. The two successive operations of hydrogenation and oxidation lead to the two forms: alkylated anthrahydroquinone and alkylated anthraquinone. These operations are effected within a solvent. The solvent in question must be able to comply with a large number of requirements the main one being that it must have a good dissolving power of the quinone form and likewise the hydroquinone form present separately or simultaneously in the medium. As it is known, the yield of hydrogen peroxide for a given volume of solution is proportional to the concentration of hydroquinone in the medium.

Now, it is a known fact that the best solvents of the quinone form are generally bad solvents of the hydroquinone form and, conversely, good solvents of the hydroquinone form are in general bad solvents of the quinone form. This rules out the use as a single solvent of products which are otherwise outstanding on account of their dissolving power for either of the said two forms.

Good results are also known to be obtained by using mixtures of two solvents in about equal proportions, one of these solvents having a good dissolving power for the quinone form and generally being a poor solvent for the hydroquinone form, the other solvent having converse qualities. The solubility of hydroquinone in the mixtures proposed is generally only about half that of the quinone on which it is based. The physical characteristics and the chemical nature of the two constituents of such mixtures are usually very different. The fact that one of the constituents of such a mixture has often a very different volatility from that of the other constituent may lead to a change in the composition of the mixture in the course of the recirculation of the solution during continuous application of the process. This may give rise to troublesome precipitations of either of the two forms, that is, the quinone or the hydroquinone and likewise modify the physical properties such as the viscosity and density.

The desire to make use of a single solvent which would not lead to the above disadvantages has led to the elimination of the best solvents for the two forms, namely quinone and hydroquinone and the adoption of average solvents for both the quinone form and the hydroquinone form considered separately or in mixture, enabling a concentration of the hydroquinone to be obtained between half and two-thirds of that of the quinone giving rise to it. It has been ascertained that an excess of quinone is necessary in order to obtain a maximum concentration of the hydroquinone. If any attempt is made to increase the production of hydrogen peroxide for a given volume of solution by hydrogenating a greater proportion of the quinone form, a precipitation of the hydroquinone form ensues. The solubility, therefore, of the latter limits the amount of quinone which can be used in the case where the quinone is the more soluble of the two forms.

The use has been advised of esters of dicarboxylic acids containing from 12 to 26 atoms of carbon in the ester molecule as solvents for the alkylated anthraquinones and alkylated anthrahydroquinones. Certain of these esters, although they are relatively good solvents of the oxidised and hydrogenated forms of the alkylated anthraquinones suffer however from the serious drawback that they are viscous, resulting in a reduction of the rate of hydrogenation and oxidation and their densities are too close to 1 which renders the extraction of the hydrogen peroxide by washing with water more difficult.

It is an object of the present invention to provide a solvent or mixture of solvents which will show a satisfactory solubility of the alkylated anthraquinones when respectively oxidized and hydrogenated.

It is another object of the present invention to provide a solvent or mixture of solvents which will have a low density and a low viscosity when saturated with quinone (approx. $d=0.90$).

It is a further object of the invention to provide a solvent or mixture of solvents which will have a low volatility (atmospheric boiling point between 150–210° C.).

It is also an object of the invention to provide a solvent or mixture of solvents which will have a low solubility in water (of the order of 1:2000).

After a careful study of a large number of products selected among the esters, alcohols, hydrocarbons and ether oxides, etc., it has been found by applicants that the products which are most suitable as solvents in the process of manufacture of hydrogen peroxide by the oxidation and then the reduction of the alkylated anthrahydroquinones are the esters of monocarboxylic acids containing from 8 to 10 and particularly 9 atoms of carbon in the ester molecule, particularly those of the aliphatic series. The table below will show the properties of two of these solvents given by way of example only. It applies, together with the suceeding tables, to solution of 2-ethyl-antraquinone and of 2-ethyl-anthrahydroquinone.

But, it would also be possible to use other alkylated anthraquinones, particularly tert-butyl anthraquinone; the latter is a particularly interesting product for carrying out the process owing to its high solubility in the solvents which are the object of the invention.

| Products | Solubility of quinone, percent | Solubility of hydroquinone, percent | Rate of hydrogenation, cm.³/min. | Relative viscosity at 22° C. | Separation of layers, after washing with water |
|---|---|---|---|---|---|
| n-heptyl acetate | 10.6 | 5.5 | 30 | 0.9 | marked. |
| ethyl heptanoate | 9 | 4.7 | 35 | 0.91 | very marked. |

For the tables, the determination of the maximum figure of the solubility of the hydroquinone was only carried out after a 17-hour stay in a thermostat of the solution of reduced form, under a hydrogen atmosphere to make sure there was no precipitation due to the strong tendency to supersaturation of the quinone, quinhydrone, hydroquinone mixture.

The duration of this supersaturation varies a great deal. If the oxidation is carried out immediately after hydrogenation and filtration it would be possible to obtain better figures for the solubility of the hydroquinone but these could not be used as a basis for commercial applications.

The dissolving power of these esters can be further improved, particularly as regards the anthrahydroquinone by adding a small amount of alcohol the molecule of which contains 6 to 9 atoms of carbon, such as n-heptanol or n-octanol, the said amount being between 5 and 20% and more particularly between 10 and 15%.

The properties of some of these mixtures are shown by way of example in the tables below.

| Products | Solubility of the quinone, percent | Solubility of the hydro-quinone, percent | Rate of hydro-genation, cm.³/min. | Relative viscosity at 22° C. | Separation of layers after washing in water |
|---|---|---|---|---|---|
| ethyl heptanoate 90%, n-heptanol 10%. | 8 | 6.4 | 32 | 0.90 | very marked. |
| ethyl heptanoate 80%, n-heptanol 20%. | 7.2 | 6.2 | 29 | 0.92 | marked. |
| ethyl heptanoate 90%, n-octanol 10%. | 8 | 5.9 | 31 | 0.90 | very marked. |
| ethyl heptanoate 80%, n-octanol 20%. | 7 | 5.4 | 27 | 0.92 | marked. |

| Products | Solubility of the quinone, percent | Solubility of the hydro-quinone, percent | Rate of hydro-genation, cm.³/min. | Relative viscosity at 23° C. | Separation of layers after washing in water |
|---|---|---|---|---|---|
| n-heptyl acetate 80%, n-heptanol 20%. | 8.5 | 7.5 | 25 | 0.96 | marked. |
| n-heptyl acetate 85%, n-heptanol 15%. | 9.1 | 7.2 | 26 | 0.94 | marked. |
| n-heptyl acetate 90%, n-heptanol 10%. | 10 | 7.1 | 28.5 | 0.94 | very marked |

If these figures are compared with those obtained with certain esters of dicarboxylic acids shown in the table below, it will be seen that although the solubility of the quinones is higher in the latter, their viscosities are also very high and the rate of hydrogenation is about three times less than in the case of the esters of moni-carboxylic acids mentioned above which makes the commercial use of the esters of dicarboxylic acids practically impossible.

| Products | Solubility of the quinone, percent | Solubility of the hydro-quinone, percent | Rate of hydro-genation, cm.³/min. | Relative viscosity | Separation of layers after washing in water |
|---|---|---|---|---|---|
| ethyl phthalate | 12 | 6.9 | 12 | 2.6 at 25° C. | marked. |
| n-butyl adipate | 9 | 6.3 | 9 | 1.5 at 20° C. | not very marked. |
| n-butyl sebacate | 7.5 | 5.8 | 10 | 1.9 at 20° C. | marked. |

However, even the properties of these esters of dicarboxylic acids can be improved, particularly their viscosities by the addition of these small amounts of the same alcohols.

The principal advantages of the mixtures according to the present invention are as follows:

(1) The construction of the hydroquinone in solution in a mixture of this type is about 30 to 40% greater than what it would be in the main solvent in pure state.

(2) The presence of this second solvent in a proportion of from 5 to 20% does not substantially change the other physical characteristics of the average solvent used alone, the latter having already been selected on account of its properties suited to the requirements of the process.

Solutions are obtained with this mixture giving the highest concentration of hydrogen peroxide per litre of solvent used and per cycle. These advantages are the same which ever of the various derivatives of the anthraquinone suitable for the process is used, particularly the alkylated anthraquinones, the tetrahydro alkylated anthraquinones, such as 2-ethyl-anthraquinone, tetrahydro 2-ethyl-anthraquinone, 2-tert-butyl anthraquinone, 2-octyl-anthraquinone.

Some examples of application of solvents illustrative of the present invention and not to be deemed limitative thereof are given hereinunder for the preparation of hydrogen peroxide from 2-ethyl anthraquinone.

*Example I.*—10 gr. of 2-ethyl anthraquinone are dissolved in 100 cm.³ of n-heptyl acetate at a temperature of 23° C. 1 gr. of finely divided nickel (Raney nickel) is added and agitation is effected under hydrogen current at a temperature of 23° C. 517 cm.³ of hydrogen (reckoned as dry hydrogen at a temperature of 0° at a pressure of 760 mm. of mercury) are absorbed in 18 minutes. This amount can be absorbed without any risk of immediate or subsequent precipitation. The catalyst if filtered and the solution is subjected to air bubbling until it returns to its initial state. Washing is effected three times with water. In the washing water was found 0.770 gr. of hydrogen peroxide reckoned as 100% hydrogen peroxide. The yield calculated on the hydrogen absorbed was 98%. The organic solution after decanting and possibly drying was then ready for recycling in a fresh operation. A repetition of 15 complete cycles of hydrogenation and oxidation under the conditions mentioned of this example confirmed the foregoing results without changing the properties of the solution.

*Example II.*—8 gr. of 2-ethyl anthraquinone are dissolved in 100 cm.³ of n-ethyl heptanoate at a temperature of 23° C. 0.8 gr. of finely divided nickel (Raney nickel) is added and agitation is carried out under a hydrogen current at a temperature of 23° C. 442 cm.³ of hydrogen (calculated as dry hydrogen at a temperature of 0° C. at a pressure of 760 mm. of mercury) was absorbed in 18 minutes. This quantity may be absorbed without risk of immediate or subsequent precipitation. The catalyst is filtered and the solution subjected to air bubbling until it returned to its initial stage. Washing was carried out three times with water. 0.656 gr. of hydrogen peroxide reckoned as 100% hydrogen peroxide was found in the washing water. The yield calculated on the hydrogen absorbed was 97.7%. The organic solution after decanting and possibly drying was ready for recycling in a fresh operation. The repetition of 15 complete cycles of hydrogenation and oxidation under the conditions mentioned in this example confirmed the foregoing results without the properties of the solution being changed.

*Example III.*—20 gr. of 2-tert-butyl anthraquinone are dissolved in 100 cm.³ of n-heptyl acetate at a temperature of 23° C. (the maximum solution of the 2-tert-butyl anthraquinone in this solvent at the temperature under consideration is 26%). 2 gr. of finely divided nickel (Raney nickel) is added and agitation is effected under a current of hydrogen at a temperature of 23° C. 1.423 cm.³ of hydrogen (reckoned as dry hydrogen at a temperature of 0° C. at a pressure of 760 mm. of mercury) were absorbed in 57 minutes. This quantity may be absorbed without any risk of immediate or subsequent precipitation. The catalyst was filtered and the solution subjected to air bubbling until it returned to its initial stage. Washing was carried out three times with water. 2.09 gr. of hydrogen peroxide reckoned as 100% hydrogen peroxide was found in the washing water. The yield calculated on the hydrogen absorbed was 96.7%. The organic solution when decanted and possibly dried was ready for recycling in a fresh operation. A repetition of 15 complete cycles of hydrogenation and oxidation under the conditions mentioned in this example confirmed the preceding results without the properties of the solution being altered.

*Example IV.*—9 gr. of 2-ethyl anthraquinone was dissolved at a temperature of 23° C. in 100 cm.$^3$ of a mixture formed of 85 parts of n-heptyl acetate and 15 parts of n-heptyl alcohol by volume. 0.9 gr. of finely divided nickel (Raney nickel) was added and agitation was carried out under a hydrogen current at a temperature of 23° C. 697 cm.$^3$ of hydrogen (calculated as dry hydrogen at a temperature of 0° C. at a pressure of 760 mm. of mercury) was absorbed in 28 minutes. This amount can be absorbed without any risk of immediate or subsequent precipitation. The catalyst was filtered and the solution subjected to air bubbling until it returned to its initial state. Washing was carried out three times with water. 1.035 gr. of hydrogen peroxide reckoned as 100% hydrogen peroxide was recovered in the washing water. The yield calculated on the hydrogen absorbed was 98%. The organic solution when decanted and possibly dried was ready for recycling in a fresh operation. The repetition of 15 complete cycles of hydrogenation and oxidation under the conditions mentioned in this example confirmed the preceding results without the properties of the solution being changed.

*Example V.*—8 gr. of 2-ethyl anthraquinone was dissolved at a temperature of 23° C. in 100 cm.$^3$ of a mixture of 90 parts of n-ethyl heptanoate and 10 parts of n-heptyl alcohol by volume. 0.8 gr. of finely divided nickel (Raney nickel) was added and agitation carried out under a hydrogen current at a temperature of 23° C. 607 cm.$^3$ of hydrogen (calculated as dry hydrogen at a temperature of 0° C. under a pressure of 760 mm. of mercury) was absorbed in 28 minutes. This quantity may be absorbed without any risk of immediate or subsequent precipitation. The catalyst was filtered and the solution subjected to air bubbling until it returned to its initial stage. Washing was carried out three times with water. 0.903 gr. of hydrogen peroxide reckoned as 100% hydrogen peroxide was recovered in the washing water. The yield calculated on the hydrogen absorbed was 98%. The organic solution when decanted and possibly dried was ready for recycling in a fresh operation. The repetition of 15 complete cycles of hydrogenation and oxidation under the conditions mentioned of this example confirmed the foregoing results without the properties of the solution being changed.

What we claim is:

1. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent an ester of an acyclic monocarboxylic aliphatic acid and of an acyclic saturated alcohol, said ester containing 8 to 10 carbon atoms in its molecule.

2. In a cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent n-heptyl acetate.

3. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent ethyl heptanoate.

4. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent an ester of a straight chain monocarboxylic aliphatic acid and of a straight chain aliphatic alcohol, said ester containing 8 to 10 carbon atoms in its molecule.

5. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent a mixture of 80–95% of n-heptyl acetate and 5–20% of n-heptanol.

6. In the cyclic process of production of hydrogen peroxide catalytically hydrogenating an alkylanthaquinone dissolved in a solvent, oxidizing within the same solvent the resulting anthrahydroquinone and extracting the hydrogen peroxide formed with water, the improvement which comprises using as the solvent an ester of acetic acid and of an acyclic saturated alcohol, said ester containing 8 to 10 carbon atoms in its molecule.

7. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as a solvent an ester of heptanoic acid and of an acyclic saturated alcohol, said ester containing 8 to 10 carbon atoms in its molecule.

8. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent a mixture of 80–95% of an ester of an acyclic monocarboxylic aliphatic acid and of an acyclic saturated alcohol, said ester containing 8 to 10 carbon atoms in its molecule, and 5–20% of an aliphatic alcohol containing 6 to 9 carbon atoms in its molecule.

9. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent a mixture of 80–95% of an ester of an acyclic monocarboxylic aliphatic acid and of an acylic saturated alcohol, said ester containing 8 to 10 carbon atoms in its molecule, and 5–20% of an acyclic aliphatic alcohol containing 6 to 9 carbon atoms in its molecule.

10. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent a mixture of 80–95% of an ester of acetic acid and of an acyclic saturated alcohol, said ester containing 8 to 10 carbon atoms in its molecule, and 5–20% of an aliphatic alcohol containing 6 to 9 carbon atoms in its molecule.

11. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent a mixture of 80–95% of an ester of heptanoic acid and of an acyclic saturated alcohol, said ester containing 8 to 10 carbon atoms in its molecule, and 5–20% of an aliphatic alcohol containing 6 to 9 carbon atoms in its molecule.

12. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent a mixture of 80–95% of an ester of an acyclic monocarboxylic aliphatic acid and of an acyclic saturated alcohol, said ester containing 8 to 10 carbon atoms in its molecule, and 5–20% of n-heptanol.

13. In the cyclic process of production of hydrogen peroxide by catalytically hydrogenating an alkylanthraquinone dissolved in a solvent, oxidizing within the same solvent the resulting anthrahydroquinone and extracting the hydrogen peroxide formed with water, the improvement which comprises using as the solvent a mixture of 80–95% of an ester of an acyclic monocarboxylic aliphatic acid and of an acyclic saturated alcohol, said ester containing 8 to 10 carbon atoms in its molecule, and 5–20% of n-octanol.

14. A process according to claim 8, wherein the solvent mixture contains 10–15% of the aliphatic alcohol containing 6 to 9 carbon atoms in its molecule.

15. A process according to claim 8, wherein the aliphatic alcohol containing 6 to 9 carbon atoms in its molecule is an acylic alcohol.

References Cited in the file of this patent

UNITED STATES PATENTS

| | | |
|---|---|---|
| 2,059,569 | Filson et al. | Nov. 3, 1936 |
| 2,455,238 | Dawsey et al. | Nov. 30, 1948 |
| 2,660,580 | Von | Nov. 24, 1953 |
| 2,668,753 | Harris et al. | Feb. 9, 1954 |

FOREIGN PATENTS

| | | |
|---|---|---|
| 695,779 | Great Britain | Aug. 19, 1953 |